(12) United States Patent
Mihm et al.

(10) Patent No.: US 11,151,128 B2
(45) Date of Patent: Oct. 19, 2021

(54) DATA PARTITIONING AND TRANSFER SYSTEM

(71) Applicant: SAP SE, Walldorf (DE)

(72) Inventors: Terrance Mihm, Holmen, WI (US);
Babu Sathya, Oakdale, MN (US);
Benjamin Lorenz, Tomah, WI (US)

(73) Assignee: SAP SE, Walldorf (DE)

(*) Notice: Subject to any disclaimer, the term of this patent is extended or adjusted under 35 U.S.C. 154(b) by 227 days.

(21) Appl. No.: 16/363,246

(22) Filed: Mar. 25, 2019

(65) Prior Publication Data

US 2020/0311062 A1    Oct. 1, 2020

(51) Int. Cl.
*G06F 16/242*   (2019.01)
*G06F 9/50*    (2006.01)
*G06F 16/21*   (2019.01)
*H04L 29/08*   (2006.01)

(52) U.S. Cl.
CPC ........ *G06F 16/2423* (2019.01); *G06F 9/5077* (2013.01); *G06F 16/211* (2019.01); *G06F 16/214* (2019.01); *H04L 67/34* (2013.01)

(58) Field of Classification Search
CPC .. G06F 16/2423; G06F 9/5077; G06F 16/214; G06F 16/211; G06F 16/278; H04L 67/34
USPC ........................................................ 707/803
See application file for complete search history.

(56) References Cited

U.S. PATENT DOCUMENTS

| | | | | |
|---|---|---|---|---|
| 9,817,856 | B2* | 11/2017 | Bensberg | G06F 16/2282 |
| 9,892,150 | B2* | 2/2018 | Jayanth | G06F 16/278 |
| 2012/0166402 | A1* | 6/2012 | Pederson | G06F 16/24554 |
| | | | | 707/692 |
| 2013/0166557 | A1* | 6/2013 | Fricke | G06F 16/3331 |
| | | | | 707/737 |
| 2016/0055192 | A1* | 2/2016 | Bensberg | G06F 16/2282 |
| | | | | 707/755 |

\* cited by examiner

*Primary Examiner* — Michael Pham
(74) *Attorney, Agent, or Firm* — Sterne, Kessler, Goldstein & Fox P.L.L.C.

(57) ABSTRACT

Disclosed herein are system, method, and computer program product embodiments for providing data partitioning and transferring operations. An embodiment operates by determining a partition size and a number of partitions for an initial data set to be transferred from a first location to a second location. A uniqueness factor for at least a subset of the columns of the dataset is determined, and a set of unique columns is identified from the initial data set based on the uniqueness factor. Based on the partition size, a set of values from the row records from the set of unique columns is identified. Based on the identified set of values, the initial data set is partitioned into the number of partitions. One of transmitting or receiving at least one of the partitions is performed.

20 Claims, 5 Drawing Sheets

Table MY_TABLE with unique columns of FNAME, LNAME, and ID
Assuming we want a partition record size of 10,000, execute the following query:

SELECT FNAME, LNAME, ID FROM
( SELECT FNAME, LNAME, ID, ROW_NUMBER () (OVER ORDER BY FNAME, LNAME, ID)
FROM MY_TABLE)
WHERE MOD ( row_num, 10000) = 0;

⎫
⎬ 210
⎭

Example Results:

| FNAME | LNAME | ID |
|---|---|---|
| E | PETIT | 789 |
| JUAN A ALVAREZ | Obregon | 861 |
| R. CHIDUMALLA | SPRINIVAS | 941 |

Partition 1:

WHERE
  (
  (FNAME < 'E' ) OR
  (FNAME = 'E'  AND LNAME < 'PETIT' ) OR
  (FNAME = 'E'  AND LNAME =  'PETIT' AND ID < = 789;
  );

Partition 2:

WHERE
  (
  (FNAME > 'E' ) OR
  (FNAME = 'E'  AND LNAME > 'PETIT' ) OR
  (FNAME = 'E'  AND LNAME =  'PETIT' AND ID > = 789;
  ) AND (

Partition 3:

WHERE
  (
  (FNAME < 'JUAN A' ) OR
  (FNAME = 'JUAN A'  AND LNAME > 'ALVAREZ Obregon' ) OR
  (FNAME = 'JUAN A'  AND LNAME =  'ALVAREZ Obregon' AND ID < = 861;
  ) AND (
  (FNAME < 'R. CHIDUMALLA' ) OR
  (FNAME = 'R. CHIDUMALLA'  AND LNAME > 'SRINIVAS' ) OR
  (FNAME = 'R. CHIDUMALLA'  AND LNAME =  'SRINIVAS' AND ID < = 941
  );

Partition 4:

WHERE
  (
  (FNAME > 'R. CHIDUMALLA' ) OR
  (FNAME = 'R. CHIDUMALLA'  AND LNAME > 'SRINIVAS' ) OR
  (FNAME = 'R. CHIDUMALLA'  AND LNAME =  'SRINIVAS' AND ID > = 941;
  );

FIG. 2B

DATA PARTITIONING AND TRANSFER SYSTEM

BACKGROUND

It is often difficult to transfer large data sets between different computing systems, such as databases. The size of the dataset may be too large or consume too many resources to be transferred as a single block of data due to limits on available memory, bandwidth, processing resources, and/or storage space. An administrator may attempt to manually analyze the data and manually divide the data into different partitions—with the intent of transmitting each partition individually. However this partitioning process may be difficult if not impossible to be successfully accomplish manually with a large data set—especially if the data set is live being read and/or modified by one or more requests).

BRIEF DESCRIPTION OF THE DRAWINGS

The accompanying drawings are incorporated herein and form a part of the specification.

FIGS. 2A and 2B illustrate an example of how an exemplary data set may be partitioned by the data partitioning and transfer system (DPS), according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing data partitioning and transferring.

Figure 1:
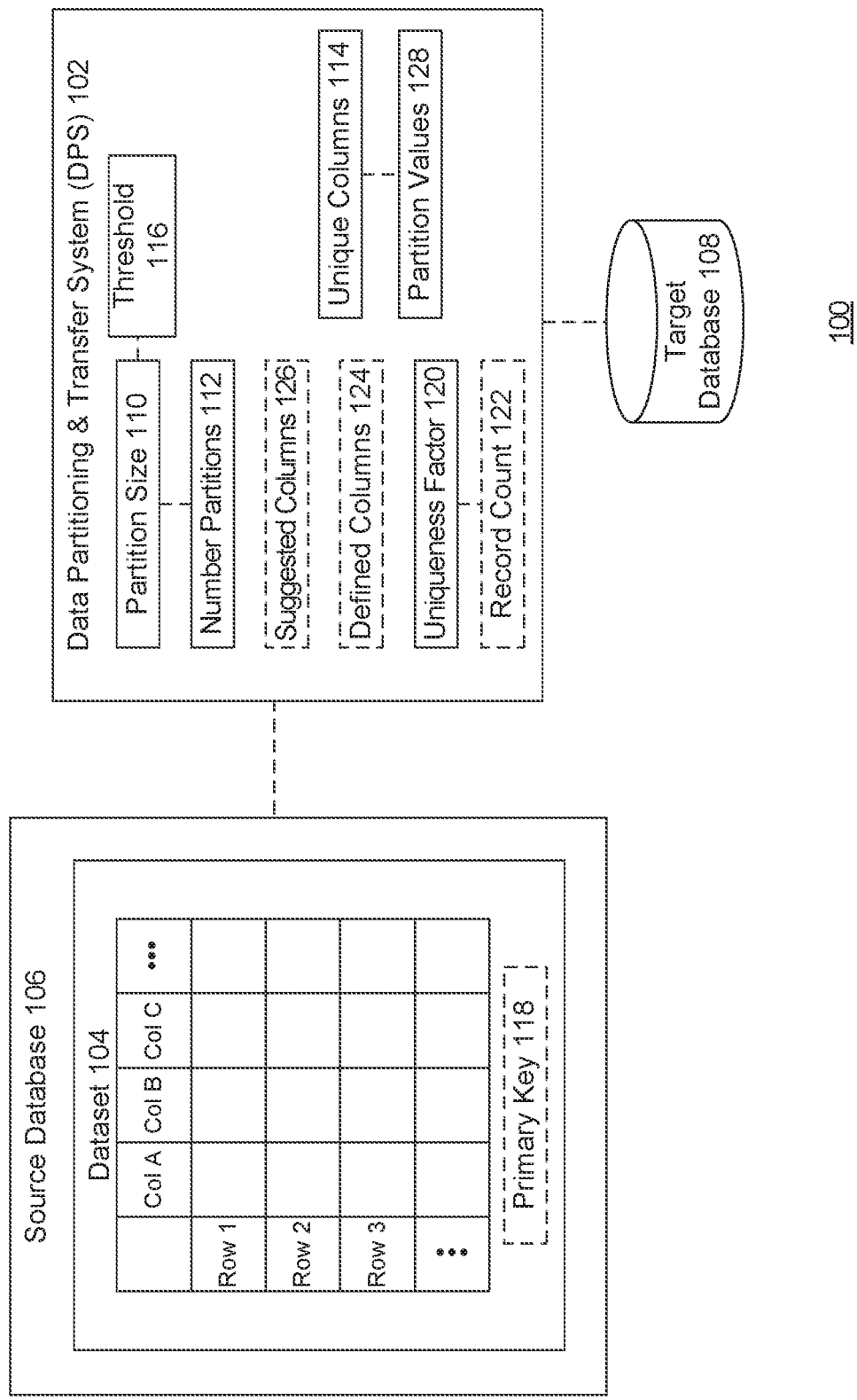
FIG. 1 is a block diagram illustrating example functionality for providing a data partitioning and transferring system (DPS), according to some embodiments.

FIG. 1 is a block diagram 100 illustrating example functionality for providing a data partitioning and transferring system (DPS) 102, according to some embodiments. In an embodiment, an administrator may seek to transfer dataset 104 from a source database 106 to a target database 108. In different embodiments, source database 106 may be or include a text file, relational database system, or other form of input or database. However, dataset 104 may be too large to be transferred without first dividing it into smaller partitions due to resource availability or system constraints, as well as other factors that will be appreciated by persons skilled in the relevant art(s).

A user or administrator may try to manually understand and parse through the data to try to determine an advantageous number of partitions and how to equally partition the data. However, for an active or live dataset 104 that is being accessed and modified by various requests from different processes, or for data sets in the hundreds of millions or billions of records this task may be impossible. Any partitions determined by the user would almost necessarily be of varying sizes, resulting in uneven system performance. Also, the larger partitions may risk or cause system backups, slowdowns, out of memory errors, or even system crashes.

DPS 102 may analyze the dataset 104 and determine how to divide the data into different, equally sized (or roughly equally sized) partitions with little or no user or administrator input. This may enable the computing systems (transferring and/or receiving the partitions) to improve or even maximize their available resources and throughput, continuing operations (such as data modification and read operations on dataset 104), without delay, backup, or interruption.

DPS 102 may determine or calculate a partition size 110 and a number of partitions 112 for dataset 104. In an embodiment, a user (such as an administrator) may provide either of these values. However, if no values are provided, DPS 102 may calculate or determine advantageous or even optimal values based on the size of dataset 104 and computing, bandwidth, processing resource availability, and/or other factors that will be apparent to persons skilled in the relevant art(s). In an embodiment, DPS 102 may utilize existing profiling results (e.g., such as frequency distribution) to determine or calculate partition sizes.

In an embodiment, target DB 108 may have a hard or resource limit of being configured for receiving or storing 2 billion records at a time. Then, for example, DPS 102 may ensure partition size 110 is less than 2 billion records. However, available memory or bandwidth to transfer the records between source DB 106 and target DB 108 may not be able to support transmissions of 2 billion records, but instead may only be able to support maximum transfers of 8 million records. Then, for example, partition size 110 may have a default or maximum value of 8 million records. In other embodiments, there may be other, varying resource limits and default values may be adjusted or computed based on computing, bandwidth, or other resource availability.

In an embodiment, dataset 104 may include millions, hundreds of millions, or even billions of unique rows or records. Each record may include its own set of values across a set of columns. DPS 102 may identify a set of one or more unique cols 114 which enables DPS 102 to differentiate between the various rows or records from one another for partitioning purposes. In some embodiments, each of the determined number of partitions 112 of dataset 104 will be equal or roughly equal and have the same partition size 110 (at least within a threshold 116).

As referenced above the number of partitions 112 and partition size 110 may be provided by a user, or may otherwise be decided based on system resource availability and/or the size of dataset 104. In an embodiment, DPS 102 may divide dataset 104 into equally sized partitions (110) based on resource availability, for all the partitions, except for the last one which may include any leftover records that were not included in the previous partitions. For example, if dataset 104 includes 1000 records, the partition size 110 may be 300, resulting in three equally sized partitions of 300 records each, and a fourth partition of 100 records.

In another embodiment, the partitions may not all be equally sized, but may be roughly the same size within a threshold 116. The threshold 116 may indicate a number of records or percentage of variance which is allowable between the partitions relative to partition size 110 (with the exception of the last partition which may exceed threshold 116). For example, for 1000 records, threshold may be 25 records. Then, for example, DPS 102 may generate partitions of size 300, 288, 311, and 101.

DPS 102 may partition dataset 104 based on unique cols 114. Unique cols 114 may be any combination of one or more columns of dataset 104 (in a row-oriented database) that together may uniquely identify or be used to distinguish between different partitions. In an embodiment, dataset 104 may include metadata that indicates one or more previously identified columns as being primary keys 118. The primary key(s) 118 may uniquely identify each row or record in a relational database table. If a primary key 118 has been identified, then DPS 102 may use primary key 118 as unique cols 114, and partition dataset 104 in accordance with what is described herein.

If no primary key 118 has been identified, then DPS 102 may calculate a uniqueness factor 120 to identify which column(s) to use as unique cols 114. In an embodiment, uniqueness factor 120 may indicate how many unique values exist across the rows (or identified subset of rows) of dataset 104. For example, if col A indicates the sex of a person, there may only be two possible values M/F. The uniqueness factor of col A may be two.

Col B may indicate the state in which an account has been opened. DPS 102 may parse through the values of col B (or metadata or index associated with col B) to determine how many different states are provided as values across all the rows. While up to 51 states (including Washington, D.C.) may be the maximum uniqueness factor or value for the state column, the actual values of col B may only include Florida, Georgia, Texas, California, New York, and Virginia. In which case the uniqueness factor may be 6.

Uniqueness factor 120 may also correspond to the maximum number of partitions that would be supported by using that column as a unique column 114. For example, if num partitions 112 has been determined to be 6, then in continuing the example above, DPS 102 may select col B as unique col 114 instead of col A (which only allows up to two partitions).

However, the correspondence between num partitions 112 and uniqueness factor 120 is not the only factor that may be taken into account by DPS 102 in selecting unique cols 114. DPS 102 may also perform a record count 122. Record count 122 may indicate how many records belong to the various partitions or how balanced/even the various partitions are as indicated by the specified column. In an embodiment, record count 122 may be compared to partition size 110 to determine its applicability.

For example, as indicated above, in an embodiment, the goal may be for each partition to be the same (or within a threshold 116) of partition size 110. If dataset 104 includes 1000 records and 990 are in Virginia, and the remaining 10 are spread across Florida, Georgia, Texas, California and New York, col B may not be an appropriate selection as a unique col 114. Record count 122 may be 990/1000 or 99/100 or 0.99 indicating a size of the largest partition relative to the remaining partitions, or may indicate the size of the smallest partition (relative to the total size of dataset 104 to be transferred).

In another embodiment, if the num partitions 112 for the 1000 records is 6, then partition size 110 may be 166. DPS 102 may determine that the largest partition size 990 exceeds a threshold 116, and that if col B is going to be used as unique col 114, it needs to be combined with one or more other columns to satisfy threshold 116. In an embodiment threshold 116 may be 0, such that each partition (except the last one) is the same size.

DPS 102 may then identify a combination of columns as unique cols 114 that enable DPS 102 to maintain partition size 110 within threshold 116. As just referenced, without a pre-determined primary key 118, DPS 102 may calculate uniqueness factor 120 and record count 122 for the columns of dataset 104 to identify the combination or combinations of columns that satisfy the partition size 110 and/or num partitions 112 determinations. Based on different combinations of the calculated uniqueness factors 120, record counts 122, and relative partition sizes 110, unique cols 114 may be identified.

However, in another embodiment, a user may provide defined cols 124. Defined cols 124 may include one or more user-specified columns to be used as one or more of the unique cols 114. For example, a user may specify a combination of defined columns 124 that uniquely identify all the rows, or enough rows to satisfy partition size 110 and num partitions 112 within threshold 116, in which case DPS 102 may use defined columns 124 as unique cols 114 (similar to how primary key 118 is used). In an embodiment, DPS 102 may not then need to analyze the columns of dataset 104 and calculate the varying uniqueness factors 120.

In another embodiment, a user may specify a single defined column 124 which may not be sufficient to satisfy partition size 110 and num partitions 112 within threshold 116. Then, for example, DPS 102 may use defined col 124 as one of the unique cols 114, and identify one or more supplemental columns based on calculating uniqueness factors 120 to use in combination with defined col 124.

In another embodiment, a user may specify one or more suggested cols 126. DPS 102 may use suggested cols 126 as a starting point for analyzing the uniqueness factor 120 and record count 122 of the various cols of dataset 104. For example, rather than beginning with col. A, and then moving on to cols B, C, D, . . . , DPS 102 may begin processing with suggested cols 126. If suggested cols 126 satisfy the balance between determined partition size 110 and num partitions 112, then DPS 102 may not process the remaining columns and save resources.

In another embodiment, a user may specify both one or more defined columns 124 and one or more suggested cols 126. DPS 102 may then use the defined columns 124 as unique cols 114, and if insufficient to satisfy threshold 116, may calculate and process suggested cols 126 to determine if threshold 116 is satisfied. Then, if suggest cols 126 do not satisfy threshold 116 in combination with defined cols 124, the remaining cols of dataset 104 may be processed until a final set of unique cols 114 are identified.

Once a set of unique cols 114 are identified, DPS 102 may identify a set of partition values 128. Partition values 128 may uniquely identify those rows or records from dataset 104 (e.g., the actual values stored in dataset 104) that mark the beginning and/or end of each partition. In an embodiment, DPS 102 may determine partition values 128 as a result of performing a query on dataset 104 based on partition size 110 and unique cols 114. An example of how partition values 128 may be determined is illustrated and further described with reference to FIGS. 2A and 2B.

FIGS. 2A and 2B illustrate an example of how an exemplary data set may be partitioned by the data partitioning and transfer system (DPS) 102, according to some embodiments.

In FIG. 2A, the SQL (structured query language) statement 210 is an example of an SQL statement that may be produced by DPS 102 to determine partition values 126. In the illustrated example, the unique cols 114 may be identified as being FNAME, LNAME, and ID and partition size 110 may be 10,000 records.

In an embodiment, DPS 102 may submit the query 210 to source DB 106 and receive resultant table 220. Table 220 may indicate the partition values 126 which may be used to divide the dataset 104 into the four partitions illustrated in 2B.

In the example shown, the num partitions 112 may be 4 (which may correspond to the nearest round integer (rounding up) when the number of data values of dataset 104 is divided by partition size 110 (e.g., of 10,000). In an embodiment, dataset 102 may include anywhere between 30,001-40,000 records to be transferred. Each of partitions 1-3 may be set to 10,000, and partition 4 may include the remaining records not included in partitions 1-3.

As illustrated in FIG. 2B, the various partitions may include ranges of data values that may be stored in dataset 104. For example, Partition 1 may include those values with a FNAME value<'E', FNAME='E' and LNAME<'PETIT', and FNAME='E', LNAME='PETIT' and ID<=789. This combination of records may equal 10,000.

Partition 2 may include those values with FNAME>'E' and the various combinations illustrated. Partition 3 may then use a different FNAME value of 'Juan A' instead of 'E'. And partition 4 may include the remaining values. In an embodiment, rows that may have been added after partition value table 220 was computed may be included in partition 4.

In an embodiment, NULL value processing may be handled differently by DPS 102. For example, if the first name for a particular record is unknown or missing (e.g., NULL), then the comparison of FNAME<, =, or >'E' may fail. As such, any records containing NULL values for the unique cols 114 may be provided at the end of partition 4, or as part of a NULL value partition 5. In this manner, DPS 102 may preserve those values of dataset 102 which have been set to NULL.

Returning to FIG. 1, in an embodiment, the determined SQL statements for each partition may be executed by source DB 106 to determine how to divide and transmit data to target DB 108. In various embodiments, DPS 102 may be operating as part of source DB 106, target DB 108, or as a standalone process that is communicatively coupled to source DB 106 and/or target DB 108.

While the embodiments described herein are referenced primarily towards the transfer of data between databases 106, 108, in other embodiments, dataset 104 may include one or more files or other data that is to be transferred.

Figure 3:
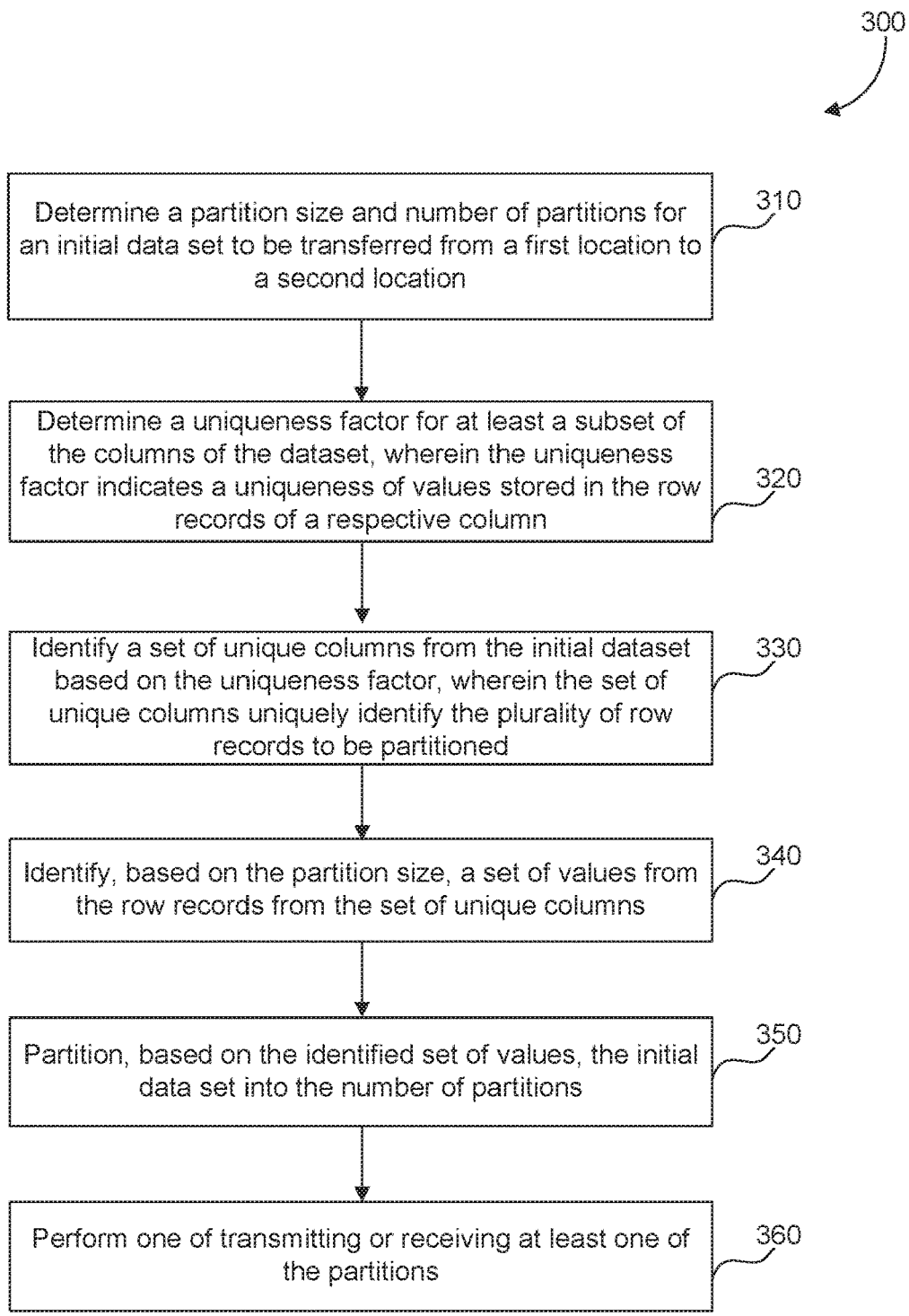
FIG. 3 is a flowchart illustrating example operations of a data partitioning and transferring system (DPS), according to some embodiments.

FIG. 3 is a flowchart 300 illustrating example operations of a data partitioning and transferring system (DPS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to the example embodiments.

In 310, a partition size and a number of partitions for an initial data set to be transferred from a first location to a second location are determined. For example, DPS 102 may determine into how many partitions to divide dataset 104 for transfer from a source computing system 106 to a target computing system 108. In an embodiment, DPS 102 may be operating on either source 106 or target 108, or may be operating as an independent intermediary.

In 320, a uniqueness factor for at least a subset of the columns of the dataset is determined, wherein the uniqueness factor indicates a uniqueness of values stored in the row records of a respective column. For example, if primary keys 118 or defined cols 124 are determined by DPS 102, then DPS 102 may calculate uniqueness factor 120 for the various columns of dataset 104. In an embodiment, a user may provide suggested cols 126 which may indicate which columns of dataset 104 on which to begin the uniqueness factor 120 calculation and processing.

In 330, a set of unique columns from the initial data set based on the uniqueness factor is identified, wherein the set of unique columns uniquely identify the plurality of row records to be partitioned. For example, based on the varying uniqueness factors 120 and record counts 122, DPS 102 may identify a set of unique columns 114 by which dataset 104 may be divided into num partitions 112 of partition size 110 within a specified threshold 116 (which may be default set to 0).

In 340, based on the partition size, a set of values from the row records from the set of unique columns is identified. For example, as illustrated in FIG. 2A, DPS 102 may generate an SQL statement or query 210 that may be submitted to source DB 106. Source DB 106 may then return partition values 128 in the form of a table of values 220.

In 350, based on the identified set of values, the initial data set is partitioned into the number of partitions. For example, as illustrated in FIG. 2B, DPS 102 may provide this partition framework for the various partitions to source DB 106 for execution, by which source DB 106 may partition dataset 104.

In 360, one of transmitting or receiving at least one of the partitions is performed. For example, source DB 106 may use the framework 220 to partition dataset 104 and transmit it to target DB 108. Or target DB 108 may receive the partitions, store them appropriately, and acknowledge successful receipt of the partitions of dataset 104.

Figure 4:
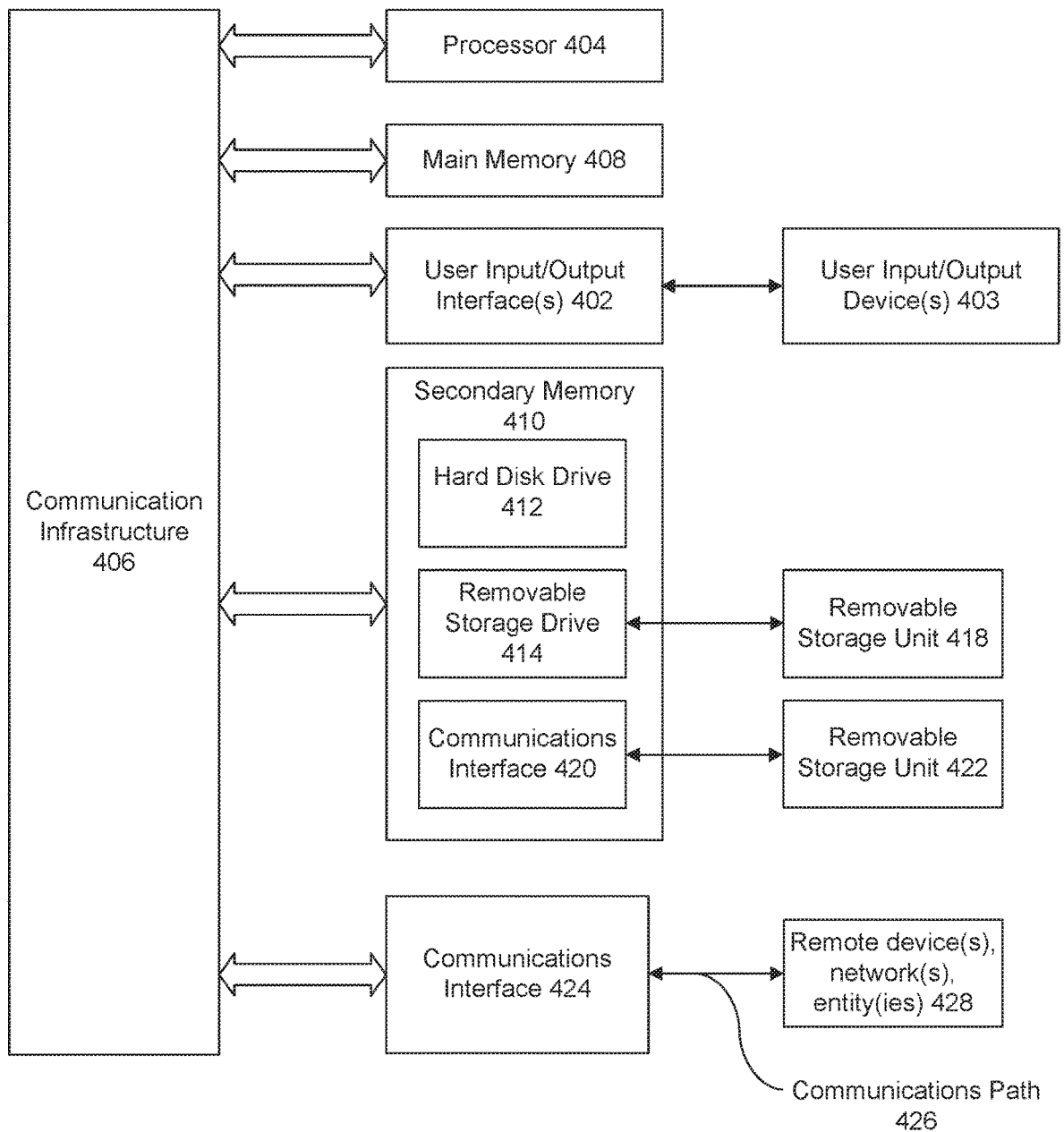
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
   determining a partition size and a number of partitions for each of a plurality of partitions by which to partition an initial data set to be transferred from a first location to a second location, wherein the initial data set comprises a plurality of columns, each column including a plurality of row records to be partitioned;
   determining a uniqueness factor for each column of a subset comprising two or more of the plurality of columns of the initial dataset, wherein the uniqueness factor indicates a count of how many unique values are stored across the plurality of rows of each column of the subset, and wherein the uniqueness factor for each column of the subset is less than a number of rows for each respective column of the subset;
   identifying a partition set of two or more columns from the subset to use to partition the initial data set, wherein the identifying is based on a combined uniqueness factor for the identified partition set of two or more columns being greater than or equal to the number of partitions;
   identifying, based on the partition size, a set of values from the row records from the partition set of columns;
   partitioning, based on the identified set of values, the initial data set into the number of partitions; and
   performing one of transmitting or receiving at least one of the partitions.

2. The method of claim 1, wherein determining the uniqueness factor comprises:
   determining a primary key from metadata associated with the initial data set, wherein the partition set of two or more columns incudes the primary key.

3. The method of claim 1, wherein determining the uniqueness factor comprises:
   determining a set of defined columns provided by a user;
   determining the uniqueness factor for each of the columns of the defined set of columns; and
   determining that the partition set of two or more columns incudes the set of defined columns.

4. The method of claim 1, wherein determining the uniqueness factor comprises:
   determining a set of a plurality of suggested columns provided by a user;
   determining the uniqueness factor for the set of suggested columns; and
   determining that the partition set of two or more columns includes one or more of the plurality of suggested columns, wherein one or more of the plurality of suggested columns is not included in the partition set.

5. The method of claim 1, wherein determining the uniqueness factor comprises:
   determining a set of suggested columns provided by a user;
   determining the uniqueness factor for the set of suggested columns;
   determining that no unique set of columns corresponding to the number of partitions exist amongst the set of suggested columns;
   determining the uniqueness factor for at least one or more columns other than the set of suggested columns; and
   identifying the set of unique columns from the set of suggested columns and the one more other columns.

6. The method of claim 1, wherein the identifying the set of values comprises:
   determining that each of the plurality of the partitions includes a same number of records, except for one partition that includes a different number of records.

7. The method of claim 1, wherein the determining the partition size and the number of partitions comprises:
   receiving at least one of the partition size or the number of partitions from a user.

8. The method of claim 7, wherein the determining the partition size and the number of partitions comprises:
   determining at least one of the partition size or the number of partitions based on computing resource availability.

9. The method of claim 2, further comprising:
   determining a threshold for the partition size, wherein the threshold comprises a value indicating an allowable variance between a size of a first one of the number of partitions and a second one of the number of partitions; and
   determining that each of the number of partitions satisfy the threshold.

10. A system comprising:
    a memory; and
    at least one processor coupled to the memory and configured to:
    determine a partition size and a number of partitions for each of a plurality of partitions by which to partition an initial data set to be transferred from a first location to a second location, wherein the initial data set comprises a plurality of columns, each column including a plurality of row records to be partitioned;
    determine a uniqueness factor for each column of a subset comprising two or more of the plurality of columns of the initial dataset, wherein the uniqueness factor indicates a count of how many unique, values are stored across the plurality of rows of each column of the subset, and wherein the uniqueness factor for each column of the subset is less than a number of rows for each respective column of the subset;
    identify a partition set of two or more columns from the subset to use to partition the initial data set, wherein the identifying is based on a combined uniqueness factor for the identified partition set of two or more columns being greater than or equal to the number of partitions;
    identify, based on the partition size, a set of values from the row records from the partition set of columns;
    partition, based on the identified set of values, the initial data set into the number of partitions; and
    perform one of transmitting or receiving at least one of the partitions.

11. The system of claim 10, wherein the at least one processor that determines the uniqueness factor is configured to:
    determine a primary key from metadata associated with the initial data set, wherein the partition set of two or more columns incudes the primary key.

12. The system of claim 10, wherein the at least one processor that determines the uniqueness factor is configured to:
    determine a set of defined columns provided by a user;
    determine the uniqueness factor for each of the columns of the defined set of columns; and
    determine that the partition set of two or more columns incudes the set of defined columns.

13. The system of claim 10, wherein the at least one processor that determines the uniqueness factor is configured to:

determine a set of a plurality of suggested columns provided by a user;

determine the uniqueness factor for the set of suggested columns; and determine that the partition set of two or more columns includes one or more of the plurality of suggested columns, wherein one or more of the plurality of suggested columns is not included in the partition set.

14. The system of claim 10, wherein the at least one processor that determines the uniqueness factor is configured to:

determine a set of suggested columns provided by a user;

determine the uniqueness factor for the set of suggested columns;

determine that no unique set of columns corresponding to the number of partitions exist amongst the set of suggested columns;

determine the uniqueness factor for at least one or more columns other than the set of suggested columns; and identify the set of unique columns from the set of suggested columns and the one more other columns.

15. The system of claim 10, wherein the at least one processor that identifies the set of values is configured to:

determine that each of the plurality of the partitions include a same number of records, except for one partition that includes a different number of records.

16. The system of claim 10, wherein the at least one processor that determines the partition size and the number of partitions is configured to:

receive at least one of the partition size or the number of partitions from a user.

17. The system of claim 16, wherein the at least one processor that determines the partition size and the number of partitions is configured to:

determine at least one of the partition size or the number of partitions based on computing resource availability.

18. A non-transitory computer-readable device having instructions stored thereon that, when executed by at least one computing device, cause the at least one computing device to perform operations comprising:

determining a partition site and a number of partitions for each of a plurality of partitions by which to partition an initial data set to be transferred from a first location to a second location, wherein the initial data set comprises a plurality of columns, each column including a plurality of row records to be partitioned;

determining a uniqueness factor for each column of a subset comprising two or more of the plurality of columns of the initial dataset, Wherein the uniqueness factor indicates a count of how many unique values are stored across the plurality of rows of each column of the subset, and wherein the uniqueness factor for each column of the subset is less than a number of rows for each respective column of the subset;

identifying a partition set of two or more columns from the subset to use to partition the initial data set, wherein the identifying is based on a combined uniqueness factor for the identified partition set of two or more columns being greater than or equal to the number of partitions;

identifying, based on the partition size, a set of values from the row records from the partition set of columns;

partitioning, based on the identified set of values, the initial data set into the number of partitions; and performing one of transmitting or receiving at least one of the partitions.

19. The non-transitory computer-readable device of claim 18, wherein the determining the uniqueness factor comprises: determining a primary key from metadata associated with the initial data, set, wherein the partition set of two or more columns incudes the primary key.

20. The non-transitory computer-readable device of claim 18, wherein the determining the uniqueness factor comprises: determining a set of defined columns provided by a user; determining the uniqueness factor for each of the columns of the defined set of columns; and determining that the partition set of two or more columns incudes the set of defined columns.

* * * * *